United States Patent [19]

Chien

[11] Patent Number: 6,121,377
[45] Date of Patent: Sep. 19, 2000

[54] PROCESS FOR THE PRODUCTION OF THERMOPLASTIC ELASTOMERIC POLYOLEFIN ALLOYS, INCLUDING SYNDIOTACTIC-ATACTIC POLYPROPYLENE ALLOYS AND ISOTACTIC-ATACTIC POLYPROPYLENE ALLOYS, AND CATALYSTS THEREFORE

[75] Inventor: James C. W. Chien, Amherst, Mass.

[73] Assignees: Academy of Applied Science; Rines and Rines, both of Concord, N.H.; part interest to each

[21] Appl. No.: 09/151,227

[22] Filed: Sep. 10, 1998

[51] Int. Cl.[7] .................................................. C08L 53/00
[52] U.S. Cl. ........................ 525/88; 526/347.2; 526/348; 526/351; 526/352
[58] Field of Search ............................. 525/88, 191, 240, 525/241, 903; 526/347.2, 348, 351, 352

[56] References Cited

U.S. PATENT DOCUMENTS 4,335,225 6/1982 Collette et al. ......................... 525/240
5,444,134 8/1995 Matsumoto ............................. 526/159

OTHER PUBLICATIONS

R. Waymouth; Advances in Stereoblock Olefin Polymerization; Presentation to US Paten Office, Nov., 1995.

Primary Examiner—Rachel Gorr
Attorney, Agent, or Firm—Rines and Rines

[57] ABSTRACT

This invention relates to thermoplastic elastomeric polyolefin alloys (preferably polypropylene alloys) and the processes for preparing naturally compatibilized polyolefin alloys using a "one-pot" polymerization of a single monomer (preferably propylene), whereby two homopolymers having different stereoisomeric structures are produced (preferably stereoregular and stereoirregular), as well as a third block copolymer having alternating sequences of the two structural segments of the two homopolymers; and wherein catalyst compositions are used enabling the direct synthesis of naturally compatibilized polymer blends comprising for components: two organometallic complexes of group IVB elements, a catalyst which irreversibly reacts with at least one ligand on the transition metal complexes converting it to catalytically active state, and a hydrocarbyl, substituted hydrocarbyl, or oxyhydrocarbyl compound of Group IIA, IIB, and IIIA metals, which functions as a cross-over agent.

10 Claims, 8 Drawing Sheets

PROCESS FOR THE PRODUCTION OF THERMOPLASTIC ELASTOMERIC POLYOLEFIN ALLOYS, INCLUDING SYNDIOTACTIC-ATACTIC POLYPROPYLENE ALLOYS AND ISOTACTIC-ATACTIC POLYPROPYLENE ALLOYS, AND CATALYSTS THEREFORE

The present invention relates to thermoplastic elastomeric polyolefin alloys, being more particularly directed to thermoplastic elastomeric alloys of syndiotactic-atactic polypropylene and of isotactic-atactic polypropylene.

BACKGROUND OF THE INVENTION

Elastomeric polypropylene has been prepared by G. Natta et al. (U.S. Pat. No. 3,175,999) using $TiCl_4/AlEt_3$ catalyst, with the resulting material containing 90% isotactic polypropylene. Collette et al. claimed in U.S. Pat. No. 4,335,225 the usage of homogeneous zirconium or hafnuim catalysts supported upon partially hydrated alumina to produce a polymer comprising 55% or less isotactic polypropylene with properties similar to the earlier product of Natta et al. Much higher activity catalysts were patented by Wilson et al. (U.S. Pat. No. 4,971,936) and by Job (U.S. Pat. No. 5,270,410) to prepare polypropylenes containing primarily isotactic (50–70%) and predominently syndiotactic structures, respectively. The lengths of the stereoregular sequences are only about 10 monomeric units. All the heterogeneous catalysts employed in the above inventions, however, are ill-defined, the polymers obtained are difficult to be characterized, and the elastomeric properties have proven inadequate for useful application, particularly with regard to tensile set.

It has been disclosed by applicant in Chien et al. U.S. Pat. No. 5,756,614 that, using an asymmetric stereorigid metallocene possessing two catalytic sites with different stereochemical control modes, a uniform well-defined stereoblock polypropylene can be prepared having long isotactic and atactic sequences alternating in the same macromolecule. Such material is an excellent thermoplastic elastomer with low tensile set and hysteresis. A somewhat similar material was also obtained using slowly rotating nonrigid metallocene (U.S. Pat. No. 5,594,080). These catalysts however, while highly useful are expensive to manufacture, relatively low in productivity, and providing materials with a somewhat limited range of properties.

The applications of a thermoplastic elastomer depend on the melting and glass transition temperatures of the materials, ($T_m$ and $T_g$), the tensile modulus, optical clarity, elongation to break, and the permanent set properties. They are determined by the percentage content of crystalline and amorphous polymers, the steric purity of the former, their molecular weights and the effectiveness of coupling between them. Different molecular structures of catalyst indeed, are required to synthesize a polymer with particular sets of properties. One way to accomplish this end is to select two metallocenes differing in stereoselectivity and rates of monomer insertion. This is not done, however, because normally, two different polymers are immiscible. This is true for different polyolefins assembled from the same monomer molecule having different geometrical, chemical, or stereochemical isomeric structures. A well-known example is low density polyethylene manufactured at high pressure and high density polyethylene manufactured at low pressure. Other prior art examples include the products of first generation Ziegler-Natta catalyzed propylene polymerization which include high molecular weight crystalline isotactic polypropylene and lower molecular weight amorphous atactic polypropylene. The two polymers are immiscible and the amorphous polymer must be removed since its presence renders the crystalline polymer physically and mechanically too weak to be of any commercial value.

Sometimes, however, two different polymers can be forced to form a compatible blend by thermomechanical means. This is generally not usually economically acceptable in view of added processing cost and degradation of the polymers. More usefully, two different homopolymers can form a compatible blend with the aid of an additive which can be a block or graft copolymer of the two homopolymers. One of the problems associated with the prior art agents and methods of blending is that it is not a simple task to devise a commercially viable synthetic method for its preparation and subsequently to blend the components into a homogeneous material without phase separation. This objective is difficult to achieve because of the short chain life times in Ziegler-Natta catalysis. This invention relates to a process providing the "one-pot" direct synthesis of "naturally" compatibilized thermoplastic elastomeric polyolefin alloy.

Well-defined organometallic compounds, such as Group IVB elements of the Periodic Table (Handbook of Chemistry and Physics, 49th Edition, Ed. R. C. Weast, Chemical Rubber Co. Cleveland, 1968) have been found to possess stereoselectivity in the polymerization of propylene depending upon the ligand structure of the catalyst precursor.

For example, in one prior art method, chiral group IVB metallocene precursors act as catalysts for the isospecific polymerization of propylene to yield isotactic polypropylene, (See U.S. Pat. No. 4,794,096 and the articles by Kaminsky et al. *Angew. Chem. Int. Ed. Engl.* 1985, 24, 307 and by Ewen in *J. Am. Chem. Soc.* 1984, 106, 6355).

In addition, Ewen et al., as disclosed in *J. Am. Chem. Soc.* 1988, 110, 6255 and U.S. Pat. No. 4,892,851, taught that zirconocene precursors having bilateral symmetry could produce syndiotactic polypropylene and are capable of polymerizing ethylene, α-olefins and cycloolefin with high activity.

Organometallic compounds having $C_{2v}$ symmetry, whether in the form of a stereorigid zirconocene or a free rotating complex (Chien et al., *Macromolecules* 1995, 28, 5399), tend to catalyze propylene polymerization without profacial selectivity. Similar nonspecific polymerizations of propylene have previously been catalyzed by titanium complexes with either a single $\eta^5$ ligand or a phenolic ligand.

All of the above precursors are activated by a cocatalyst which transforms the former catalyst into the corresponding cationic species (See U.S. Pat. No 5,198,401 and EP 573, 403). The cocatalyst comprises a cation which irreversibly reacts with at least one ligand from the Group IVB metal complexes to form the catalytically active cationic Group IVB complex. The counter anion is non-coordinating, readily displaced by a monomer or solvent, has a negative charge delocalized over the framework on the anion or within the core thereof, is not a reducing or oxidizing agent, forms stable salts with reducible Lewis acids and protonated Lewis base, and is a poor mucleophile.

Other prior types of cocatalyst include Lewis acids which will irreversibly react with at least one ligand from a Group IVB or VIII metal complex to form an anion possessing many but not all of the characteristics detailed above (See Marks et al. *J. Am. Chem. Soc.* 1991, 113, 3623).

The cocatalyst which is more commonly employed than the two types mentioned above, is methylalumoxane.

Methylalumoxane acts not only as a Lewis acid, but also serves in other useful functions as well.

High molecular weight polypropylene, having a certain steric structure, prepared individually in the presence of one of the prior art catalysts described above, is generally immiscible with another polypropylene of a different structure. For example, a solvent-cast blend of any pair of stereoisomeric polypropylenes, e.g., isotactic and atactic, or syndiotactic and atactic, tends to crumble easily, and the tensile bar press molded from the blend fails with the least bit of strain.

In another prior process, solutions of two different metallocenes are used to polymerize ethylene as if each is unaffected by the presence of the other. This method is useful for preparing polyethylenes with bimodal molecular weight distribution using two Group IVB metallocenes as disclosed by Ewen (*Studies in Surface Science and Catalysis Vol. 25 Catalytic Polymerization of Olefins* Eds. Keii et al., Kodansha, Elsevier, 1986, pp.271), and by Ahlers and Kaminsky (*Makromol. Chem.; Rapid Commun* 1988, 9, 457). The gel permeation chromatograms of the produced bimodal polyethylene are exact superposition of chromatograms for a mixture of polyethylene obtained with the two different metallocenes separately. A polypropylene having multimodal molecular weight distribution was obtained using an ansa-hafnocene and ansa-zirconocene mixture to produce isotactic polypropylenes, albeit having molar masses that are different.

Despite all of the prior processes for preparing various polymers, up until the discovery underlying the present invention, there has been no process that is capable of forming compatibilized crystalline and amorphous polyolefin alloys of the present invention. Unlike the prior art, the present invention allows one to synthesize, directly in a "one-pot" polymerization of a single monomer, useful alloys of semicrystalline and amorphous polyolefins having different steric structures without the need for subsequent blending of the polyolefins--providing such novel "one-pot" direct synthesis of "naturally" compatibilized thermoplastic elastomeric polyolefin alloy.

More specifically, the present invention provides novel thermoplastic elastomeric polypropylene alloys comprising three well-defined components: a homopolymer of stereoregular polypropylene, a homopolymer of atactic polypropylene, and a copolymer having atternating sequences of both types of stereoisomeric structures, and catalyst components useful in the production of these alloys, and with a process using such catalysts to provide independent control over the formation of the three well-defined components.

OBJECTS OF INVENTION

An object of the invention accordingly, is to provide new and improved elastomeric thermoplastic polyolefin alloys and processes and cocatalysts for producing the same, that are not subject to the limitation of the prior art as above explained; and in particular, novel thermoplastic elastomeric syndiotactic-atactic polypropylene alloys and novel thermoplastic elastomeric isotactic-atactic polypropylene alloys.

From a more generic point of view, an object of the invention is to provide novel olefin polymerization catalysts which can produce novel olefin polymers of distinct and different stereochemical structures ($A_n$ and $B_m$, later defined) as well as a third substance having blocks of the same structures ($A_aB_b$)$_x$ in its chain, the latter block copolymer bridging the $A_n$ and $B_m$ and compatibilizing the two isomeric homopolymers; for example, in one preferred embodiment, $A_n$ is an isotactic polypropylene and $B_m$ is an atactic polypropylene having the microstructures shown in the following conventional projection:

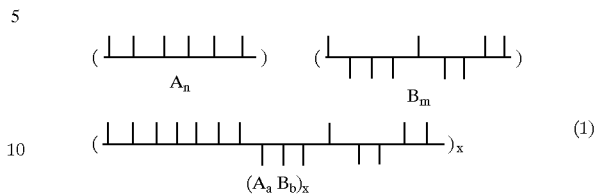

(1)

The subscripts n and m indicate the number of monomeric units in the homopolymers which are large integers (1,000 to 30,000). The subscripts a and b indicate the number of monomeric units in the block copolymers which are smaller integers (100 to 3,000), and with x ranging from 2 to 100 denoting the number of $A_aB_b$ blocks.

Another object of this invention is to provide a catalyst composition for the "one-pot" direct synthesis of the materials wherein $A_n$ and $A_a$ are syndiotactic polypropylenes and $B_m$ and $B_b$ are atactic polypropylene as shown in the following structure

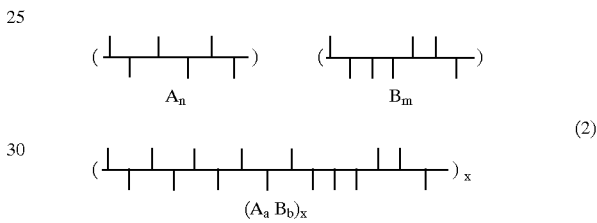

(2)

Still another object is to provide novel polymer alloy from propylene exhibiting properties of thermoplastic elastomeric properties with a wide range of $T_m$, $T_g$, tensile modulus, permanent set, yield stress, and elasticity.

Other and further objects will be explained hereafter and are more particularly delineated in the appended claims.

SUMMARY OF THE INVENTION

In summary, the present invention relates to metallocene catalyst compositions which are designed to provide chemical, regiochemical and/or stereochemical control during the polymerization of α-olefins which contain 3 or more carbon atoms ($C_{3+}$-olefin), present invention providing a novel cross-over agent that promotes and controls the interchange of propagating chains of one type of catalytic site to another, and determining the magnitudes of n, m, a, b and x integers in structures 1 and 2 above, thus providing for the formation of materials capable of bridging or compatibilizing two different homopolymers so that a "naturally" compatible thermoplastic elastomer is produced directly.

The present invention also provides for several classes of polymerization catalysts.

A first class of olefin polymerization catalyst of the present invention is formed from a bilaterally symmetric stereorigid metallocene (syn-P) and a cocatalyst capable of the syndiospecific polymerizing of propylene into a syndiotactic structure.

A second class of olefin polymerization catalyst is formed from a chiral stereorigid metallocene (iso-P) and a cocatalyst that is capable of the isospecific polymerizing of propylene or higher α-olefin into an isotactic structure.

A third class of olefin polymerization catalyst (ata-P) is formed from a non-rigid metallocene or a stereorigid $C_{2v}$ symmetric metallocene and a cocatalyst capable of polymerizing of propylene into an atactic structure.

The present invention also provides a first novel process for the polymerization of olefins having its characteristic feature in that propylene is polymerized or block-copolymerized in the presence of a catalyst selected from the iso-P class and a second precursor selected from the ata-P class, with a common cocatalyst and cross over agent.

The present invention further provides a second process for the polymerization of propylene having characteristic features in that propylene is polymerized or block-copolymerized in the presence of a catalyst of the syn-P class and another precursor selected from the ata-P classes with a common cocatalyst and cross-over agent.

Finally, the present invention provides for the types of thermoplastic elastomeric products in varying ratio and molecular weights of the constituent polymers, with a range of $T_m$ for the crystalline component and the amount of block copolymer and its a, b, and x parameters, all of which determine the physical, mechanical, optical and elastomeric properties, processing conditions, and applications.

From a more specific viewpoint, the invention embraces a compatible polyolefin alloy comprising two homopolymers $A_n$ and $B_m$ derived from the same monomer having dissimilar stereoisomeric structures and a block copolymer of the formula $(A_a B_b)_x$, wherein n and m are integers from 1,000 to 30,000, a and b are integers from 10 to 1,000, and x is an integer from 1 to 100, wherein the polyolefin alloy has a weight ratio of $A_n$ and $B_m$ between 100 to 1 and 1 to 100 and the block copolymer is between 2 and 20% by weight.

Preferred and best mode embodiments of the invention will later be detailed.

BRIEF DESCRIPTION OF THE DRAWINGS

For a better understanding of the invention, its objects, features and advantages, the following detailed description of the invention should be read in conjunction with the following figures in which.

DETAILED DESCRIPTION OF PREFERRED EMBODIMENTS(S) OF THE INVENTION

Figure 1:
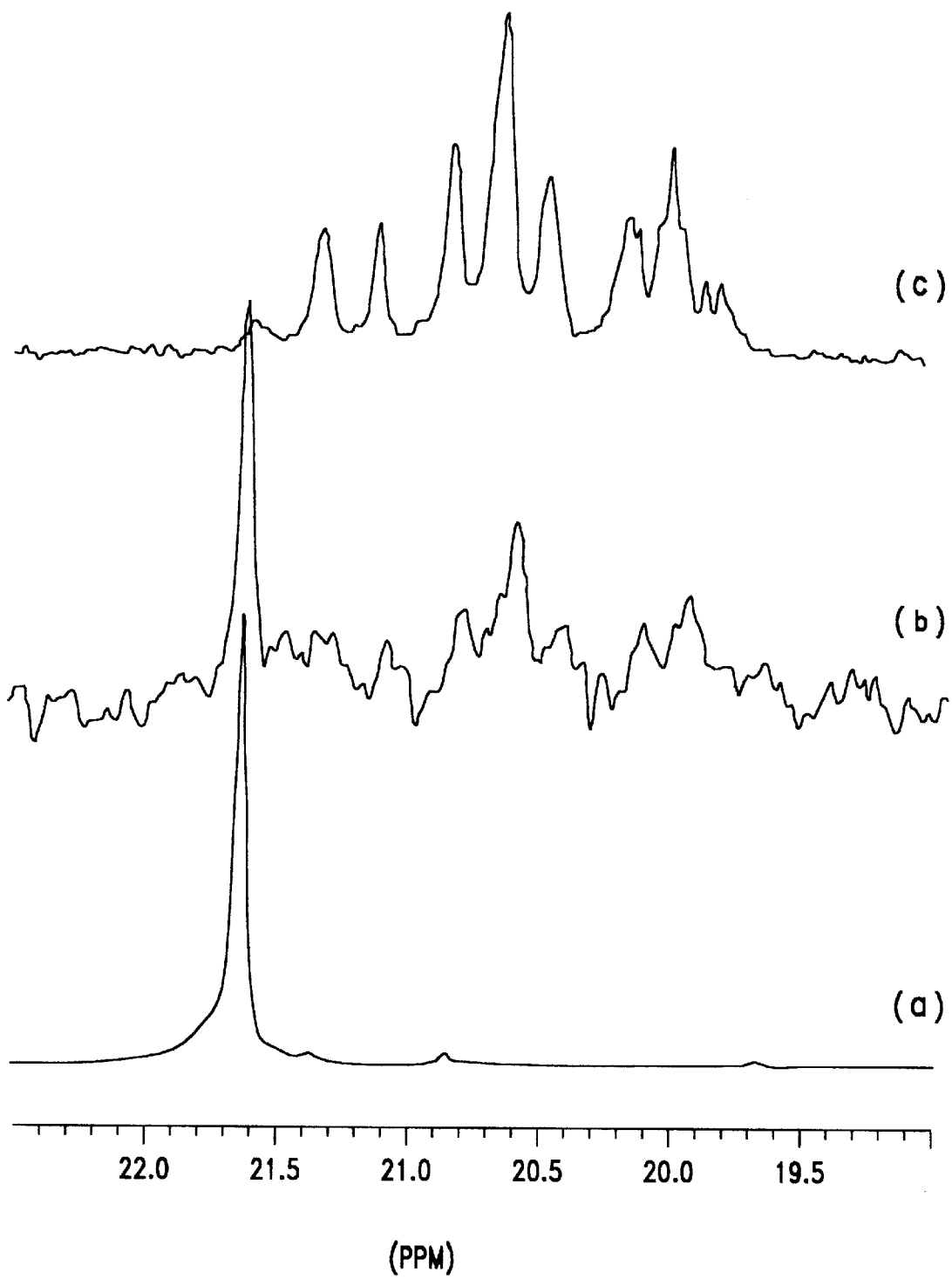
FIG. 1 illustrates room temperature $^{13}C$ NMR spectra in the methyl region of polypropylene as found in later described Example 1 of the present invention, including (a) the heptane insoluble isotactic fraction; (b) the heptane soluble but hexane insoluble stereoblock fraction; and (c) the diethylether soluble atactic fraction.

The compounds used herein are referred to either by names of common usage or the scientifically correct names for the sake of convenience. The bis(cyclopentadienyl) Group IVB metal compounds may be referred to as "metallocene" embracing all other $\eta^5$-rings such as indenyl, tetrahydroindenyl, fluorenyl, tetrahydrofluorenyl, octahydrofluorenyl, benz[e]indenyl, benz[f]indenyl, or in general, substituted cyclopentadienyl rings and their derivatives with substituents. The metal compounds may have two identical "cyclopentadienyls" or two dissimilar $\eta^5$-rings. Cp, Ind and Flu are used to denote respectively, the cyclopentadienyl, indenyl and fluorenyl radicals. In addition, a "metallocene" wherein the metal is titanium may be referred to as a "titanocene", wherein the metal is zirconium as a "zirconocene", and wherein the metal is hafnium as a "hafnocene".

Preferably, the olefin polymerization catalysts of the present invention are prepared from two or more metallocene precursors and a cocatalyst, with the metallocene precursors of the present invention being complexes of Group IVB elements, including Ti, Zr and Hf, having one or more $\eta^5$-ligands including, for example, Cp, Ind, and Flu having strategically placed hydrocarbyl groups of one (1) to forty (40) carbon atoms.

In the case of two $\eta^5$-ligands, they may be bridged by 3, 2, 1 or 0 atoms selected from the group IIIA, IVA, VA, and VIA of the Periodic Table. The number and type of bridging atoms are determined by the stereorigidity and accessibility desired of the metallocene. One pentahapto ligand complex may contain a bridge connecting it to a nonhapto-group having a heteroatom selected from the group IIIA to VIA suitable for covalent or dative bonding to the group IVB metal center, the remaining nonhapto-ligands are selected from groups of hydrocarbyls having 1 to 20 carbon atoms, alkyl group having 3 to 30 carbon atoms, or the Group VIIA atoms.

The olefin polymerization cocatalysts preferably are Brønsted or Lewis acid and nucleophilic cations. Other possible cocatalysts are hydrocarbyl or oxyhydrocarbyl compounds from the Group IIIA elements. These cocatalysts function by oxidation of an anionic nonhapto-ligand from the organometallic precursor to generate the catalytic active corresponding cationic Group IVB species. The counter-anion formed by the cocatalyst of the present invention is bulky, inert and noncoordinating toward the Group IVB metal cation formed from the metallocene precursor.

The olefin polymerization catalytic composition of the present invention provides a cross-over agent from one of the following: metal hydrocarbyls, metal halocarbyls, metal oxyhydrocarbyls, or metal oxyhalocarbyl of the Group IIB and IIIA elements. This type of compound finds various usage as a scavenger, alkylating and reducing reagent. But its role as cross-over agent is hitherto unknown because this occurs only above a threshold concentration which is hundreds to thousands times higher than when employed for the other conventional functions.

In the present invention, the stereochemical specificity of a metallocene catalyst during the polymerization of propylene is mainly determined by its molecular structure. In the preferred embodiment, there are three classes of metallocene catalysts, each of which promotes a different stereoregulated propylene insertion process as follows: (1) iso-P is a racemic metallocene of $C_2$ symmetry or an unbalanced metallocene which catalyzes isotactic enchainment, (2) syn-P is an achiral bilaterally symmetric metallocene of $C_s$ symmetry which produces syndiotactic enchainment, and (3) ata-P is a nonrigid metallocene or stereorigid metallocene of $C_{2v}$ symmetry.

Examples of iso-P metallocenes which may be used in the preparation of an isospecific propylene polymerization catalyst are as follows: rac-ethylene-bis(1-$\eta^5$-indenyl)dimethylzirconium, rac-ethylenebis(1-$\eta^5$-indenyl)dichlorozirconium (Cat. 2), rac-ethylenebis(1-$\eta^5$-4,5,6,7-tetrahydroindenyl)dimethylzirconium, rac-ethylenebis(1-$\eta^5$-4,5,6,7-tetrahydroindenyl)dichlorozirconium, rac-dimethylsilylenebis(1-$\eta^5$-indenyl)dimethylzirconium, rac-dimethylsilylenebis(1-$\eta^5$-indenyl)dichlorozirconium, (Cat. 1), rac-ethylenebis( 1-$\eta^5$-benz[e]indenyl) dimethylzirconium, rac-dimethylsilylenebis(1-$\eta^5$-benz[e]indenyl)dichlorozirconium, rac-dimethylsilylenebis(2-methyl-4-phenyl-1-$\eta^5$-indenyl)dimethylzirconium, and rac-dimethylsilylenebis(2-methyl-4-naphthyl-1 -$\eta^5$-indenyl)dichlorozirconium. The above metallocenes are arranged in the order of increasing stereoselectivity and decreasing chain termination. Therefore, in the preferred embodiment, the appropriate metallocene to produce isotactic polypropylene or other isotactic poly-α-olefin having the desired stereoregularity, melting transition temperature and molecular weight may be selected.

Examples of nonrigid ata-P metallocenes which may be used in the preparation of an atactic propylene polymerization catalyst are as follows: bis(cyclopentadienyl)dichlorozirconium, bis(cyclopentadienyl)dimethylzirconium, bis(n-butylcyclopentadienyl)dichlorozirconium, bis(pentamethylcyclopentadienyl)dimethylzirconium, and bis(cyclopentadienyl)dichlorohafnium.

Examples of stereorigid $C_{2v}$-symmetric ata-P metallocenes which may be used in the preparation of nonspecific propylene polymerization catalyst are as follows: ethylenebis(9-$\eta^5$-fluorenyl)dichlorozirconium (Cat. 3), dimethylsilylenebis(9-$\eta^5$-fluorenyl)dichlorozirconium, dimethylsilylene(2,3,4,5-tetramethyl-1-$\eta^5$-cyclopentadienyl)(t-butylamido)dichlorotitanium, and 2,2'-thiobis(4-methyl-6-t-butylphenoxy)dichlorotitanium.

In general, non-bridged zirconocene polymerizes propylene with the lowest activity to lowest molecular weight product as pointed out by Kaminsky (in *History of Polyolefins,* Ed. Seymour et al., Reidel Publishing Co. 1986, pp.257–270), whereas the stereorigid $C_{2v}$ compounds exhibit exceedingly high activity and produce a-PP having molecular weight of between half and one million.

Examples of syn-P metallocenes which may be used in the preparation of a syndiospecific propylene polymerization catalyst are as follows: diphenylmethylidene(1-$\eta^5$-cyclopentadienyl)(9-$\eta^5$-fluorenyl)methylzirconium (Cat. 4) isopropylidene(1-$\eta^5$-cyclopentadienyl)(9-$\eta^5$-fluorenyl) dichlorozirconium (Cat. 5), isopropylidene(1-$\eta^5$-cyclopentadienyl)(9-$\eta^5$-fluorenyl)dimethylzirconium, and t-butylmethylidene(1-$\eta^5$-cyclopentadienyl)(9-$\eta^5$-fluorenyl) dichlorozirconium. The above metallocenes are arranged in the order of increasing syndioselectivity and decreasing chain termination. Therefore, in the preferred embodiment, the appropriate metallocene to produce syndiotactic polypropylene having the desired properties may be selected.

The cocatalyst of the catalyst composition of the present invention may comprise a wide variety of species which are known to abstract anionic ligand to Group IVB transition metals.

Examples for neutral reducible Lewis acids which may be used in the preparation of the catalyst of the present invention are as follows: tris(pentafluorophenyl)borane, tris (ditrifluoromethylphenyl)borane, tris(2,2,2-perfluorobiphenyl)borane.

Examples of Brønsted acids which may be used in the preparation of the catalyst are as follows: phenylammonium tetrakis(pentafluorophenyl)borate, diphenylammonium tetrakis(pentafluorophenyl)borate and tributylammonium tetrakis(pentafluorophenyl)borate.

Examples for the oxymetalloids which may be used in the preparation of the catalyst of the present invention are as follows: oligomers of methylalumoxane (MAO), ethylalumoxane, propylalumoxane and butylalumoxane.

The main rationale for the choice of a cocatalyst is the degree of interaction between the metallocene cation and the counteranion, either by close approach for ion pair formation or via electron deficient-methyl bridge. Strong interaction tends to lower catalytic activity, selectivity, molecular weight, and most important of all, interference with the cross-over process. Therefore, the cocatalyst employed most frequently in this work is triphenylcarbenium tetrakis (pentafluorophenyl)borate described by Chien et al. *J. Am. Chem. Soc.* 1991, 113, 8570, which is free of the drawbacks of the other cocatalysts. It is designated hereinafter as the "Cocat" unless otherwise noted.

Using any of the above catalyst compositions as a single precursor produces only a single kind of homopolymer. Using two of the above catalysts together, there is produced a mixture of two different homopolymers that are immiscible. Thus, the present invention provides a novel component cross-over agent. If any of the above catalysts employed are isospecific and aspecific, they produce individually and independently isotactic polypropylene and atactic polypropylene. In the presence of a cross-over agent, as provided for the present invention, however, the product is a naturally compatible blend of the isotactic and atactic polypropylenes. A new substance is formed in the presence of the cross-over agent that is not formed in its absence. Its presence is established by fractionation of the product and $^{13}$C NMR determination of the polymer microstructure. In the absence of the cross-over agent, solvent extraction results in two dominant fractions with NMR spectra characteristic for the isotactic and for the atactic polypropylene. In the presence of a cross-over agent, an additional fraction is isolated whose NMR spectra is clearly the sum of the isotactic and atactic sequence (FIG. 1). It is, therefore, a stereoblock copolymer (see U.K. Letters Patent No. 9102679.9, U.S. Pat. No. 5,756,614). The same is true for the other polymerizations of the present invention whereupon syndiotactic and atactic polypropylene as well as the corresponding block polymers are formed, structures (1) and (2) above.

In the presence of two catalysts $C_A$ and $C_B$ which produce polymers independently with microstructure A and B at respective rate constants $k_A$ and $k_B$, which can be precisely and separately determined by measurement of homopolymerization rate, the desired ratio of the two homopolymers is given by:

$$\frac{[A]}{[B]} = \frac{k_A[C_A]}{k_B[C_B]}$$

This polymer alloy composition can be obtained by using the needed amount of the two catalysts. Therefore, polymer alloys having [A]/[B] ratio between 100:1 and 1:100 can be readily prepared.

The amount of the block copolymer formed in the present invention can be controled, by varying the ratio of cross-over agent to total catalyst, to lie between 2% and 20% of the total polymer.

The role of the cross-over agent is to transfer the propagating chain on one metal center carrying it to the other metal center and vice versa. Consequently, the next monomers inserted will have the respective stereodirecting influence of the new metal center.

Therefore, the catalyst composition of the present invention provides for the use of a cross-over agent selected from the group of hydrocarbyls and oxyhydrocarbyls of Group IIIA metal. Illustrative of the present invention, but not limiting examples are as follows: trimethylaluminum, triethylaluminum, tri-i-propylaluminum, tri-i-butylaluminum, and compounds containing two or more Al atoms linked through heterations such as $(C_2H_5)_2Al-O-Al$ $(C_2H_5)_2$, methylalumoxane, ethylalumoxane and butylalumoxane.

Group IIA hydrocarbyls may also function in cross-over capacity, albeit with a lower efficiency. Finally, in the absence of a cross-over agent, the chains belonging to different metal centers may interchange directly. This may occur to a discernible degree at very high catalyst concentration, which is not an economically viable condition. Consequently, the use of the cross-over agent is required for the direct "one-pot" synthesis of compatible polymer alloys in accordance with the present invention.

Polymerization Procedure

A 250 mL crown-capped glass pressure reactor with a magnetic stirring bar was first evacuated, flushed with argon, then charged with 50 mL of purified and oxygen free toluene. The system was evacuated again and saturated with gaseous monomer for ca. 20 min. to 15 psig. In the case of liquid monomer, i.e. styrene or α-olefin, the desired quantity is introduced with syringe. Cross-over agent, organometallic precursor, and cocatalyst were injected with syringe as toluene solutions in this order at 5 min. intervals to allow complete mixing. Upon completion of polymerization, the mixture was quenched with acidic methanol (containing 2% HCL), filtered, washed with methanol, and dried at 700° C. under vacuum to a constant weight.

Polymer Characterization

Polymer product was fractionated by a Kumagawa apparatus using several solvents under refluxing conditions. The solvents in the increasing order of boiling point are as follows: acetone, diethylether, n-pentane, n-hexane, n-heptane and n-octane. The microstructures of the collected fractions were determined by $^{13}$C-NMR (Bruker AMX-500, 125.77 MHz).

Extent of phase mixing or conversely phase separation were investigated on compatible polyolefin alloy of this invention and compared with simple blend of the constituent homopolymers. A specimen of the latter was prepared by dissolving the polymers under nitrogen atmosphere in one of these solvents: toluene (bp 110.60° C.), p-xylene (bp 137.80° C.), or mesitylene (bp 164.70° C. The polymer solution was poured into a Teflon dish, the solvent removed with a Dean Stark trap, and the solid dried under vacuum at 70° C. About 1 wt % of BHT (2,6-di-t-butyl-4-methylphenol) was added as an antioxidant. Polymer was press-molded into a 15 mm long, 6 mm wide, and 0.7 mm thick dog-bone-shaped specimen at 175° C. The specimen was subjected to strain imposed by an Instron machine at an uniaxial expansion rate of 150 mm/min (approximately 1000% gauge length/min). Measurement was repeated after the specimen was annealed at 110° C. for 2 hrs. Naturally compatible alloys of this invention exhibit high tensile modulus, high stress after yield strain, and ductile failure and these mechanical properties were improved by annealing of the specimen. In contrast simple blends of homopolymers display poor mechanical properties which deteriorates further after annealing.

The $T_g$ and heat of fusion ($\Delta H_f$) were measured by differential scanning calorimetry (DSC; Perkin-Elmer DSC4). The sample was annealed at 180° C. for 10 min and crystallized by cooling at a rate of 10° C./min to 50° C. in the instrument prior to recording of the DSC curve.

Figure 2:
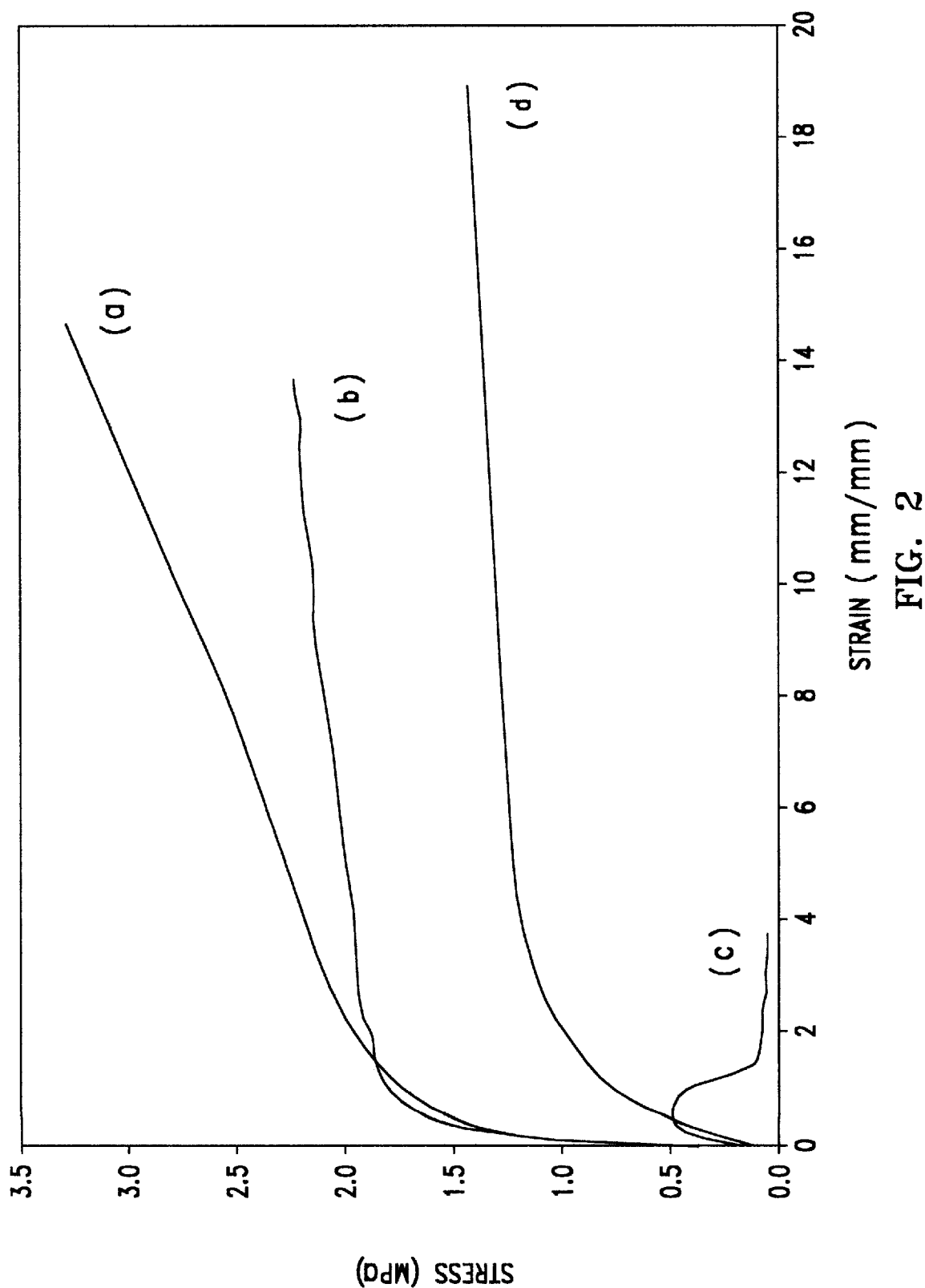
FIG. 2 illustrates the stress-strain curves of (a) a compatible isotactic/atactic polypropylene as found in Example 1 of the present invention; (b) the polypropyelene obtained in the presence of Cat. 1 (iso-P) and Cat. 3 (ata-P) catalysts immobilized on silica; (c) the atactic polypropylene synthesized with Cat. 3 (ata-P) alone; and (d) the solvent casted blend of atactic polypropylene and isotactic polypropylene obtained separately with Cat. 2 (iso-P) and Cat. 3 (ata-P)

The outstanding properties of the polymers of the present invention can be readily shown by testing. The stress-strain curves in FIG. 2a of the compatible isotactic/atactic blend of example 1 of the present invention shows that it increases in strength with strain up to 1100% elongation which is characteristic of a crosslinked elastomer. The a-PP (curve d) does not show any yield point, but a nearly perfect stress plateau until it breaks. this phenomenom is considered to be due to the high degree of entanglement in the high molecular weight atactic polymer. The application of the high extension rate of 1000% min. does not allow the material to disentangle in experimental time, and to flow. The solution cast of separately prepared isotactic and atactic polypropylene is a brittle substance without strength (curve c) indicating substantial macrophase separation in this specimen.

Figure 3:
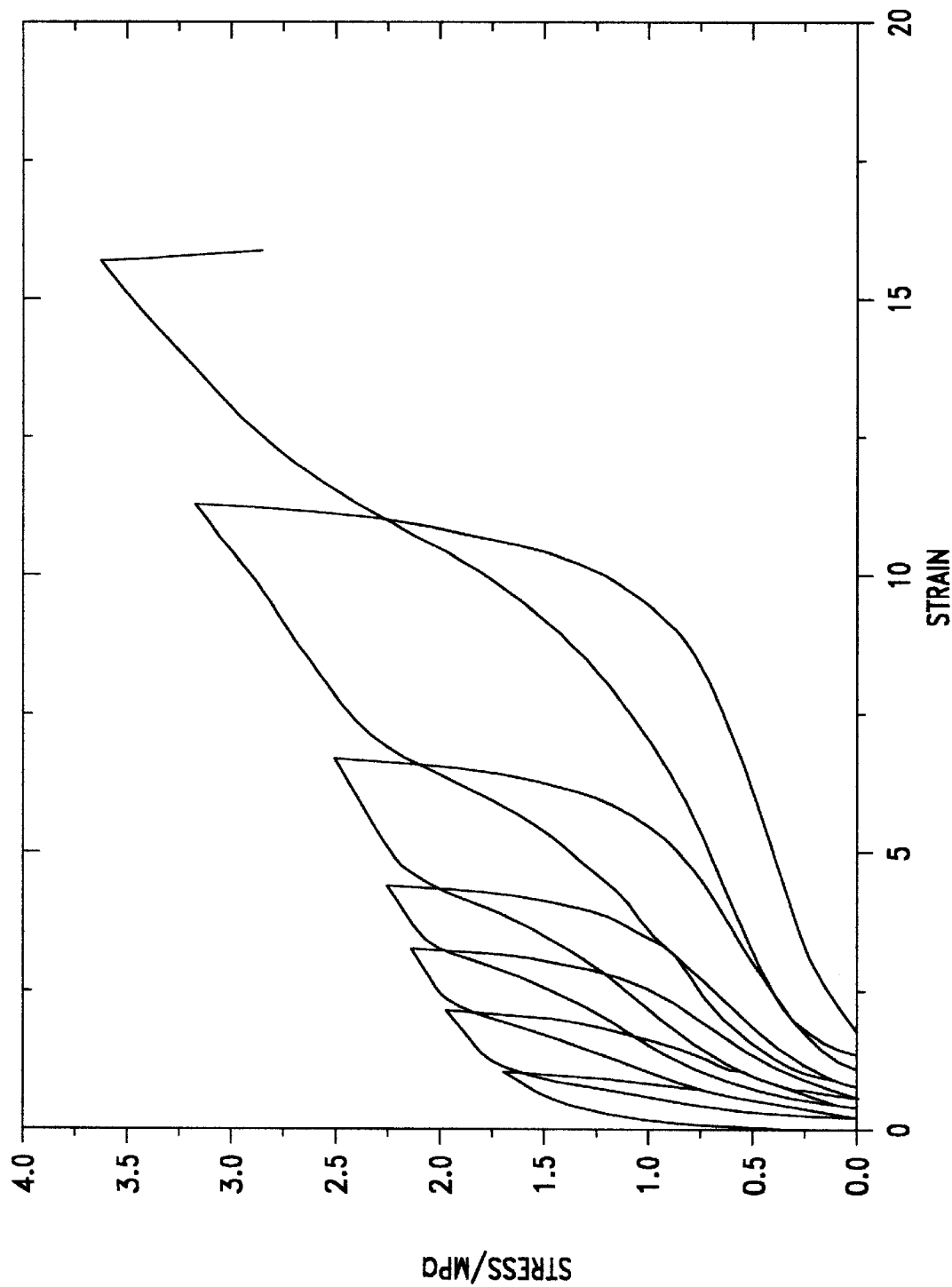
FIG. 3 illustrates the relaxation time testing of the compatible isotactic/atactic polypropylene blend in Example 1 of the present invention.

FIG. 3 illustrates the outstanding elasticity of thethermoplastic elastomer of this invention by the hysteresis curves of tensile stress measurements. Note that the expansion curve returns to the previous stress at its previous maximum strain.

Figure 4:
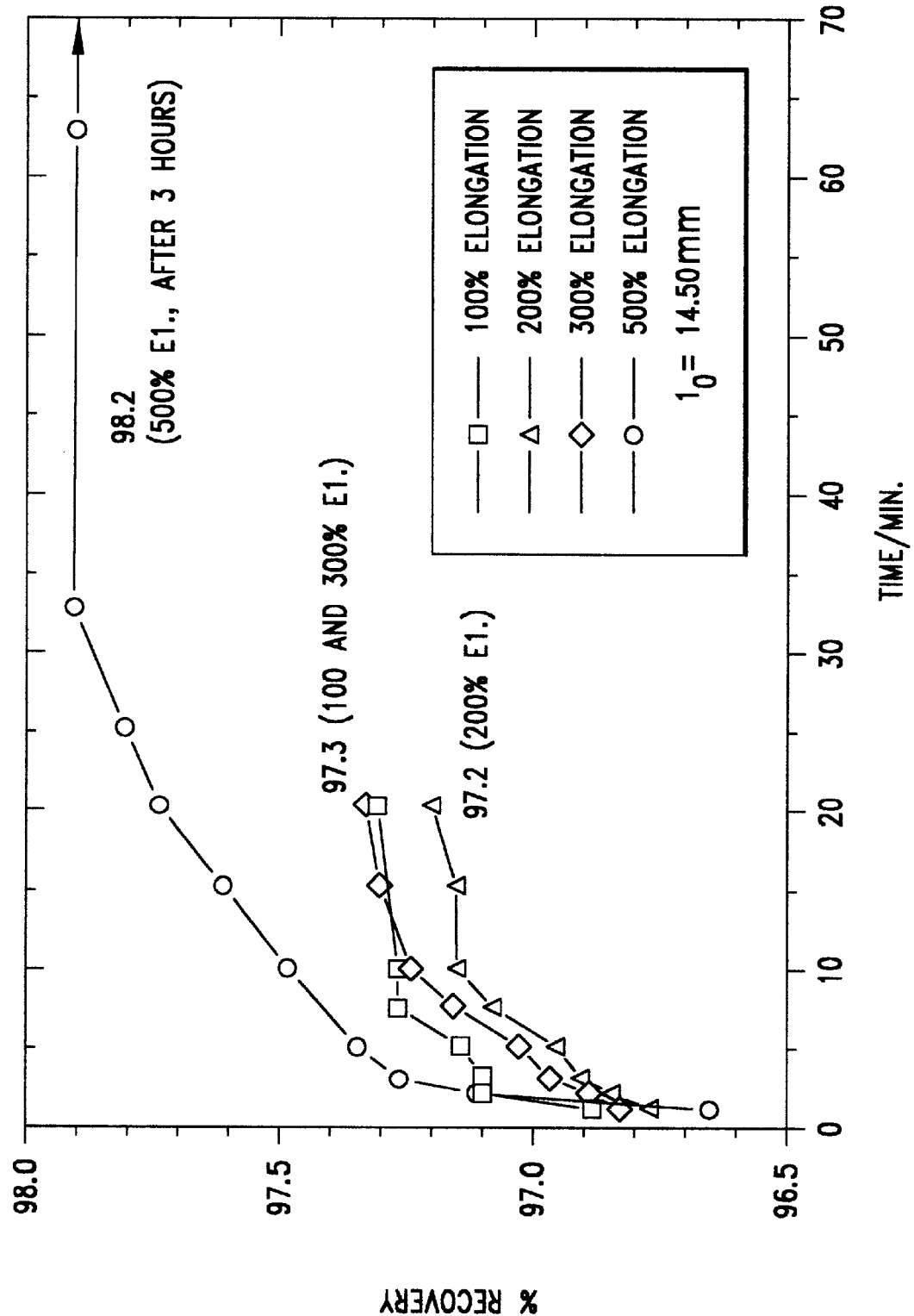
FIG. 4 illustrates the percentage of elastic recovery for the compatible isotactic/atactic polypropylene in Example 1 of the present invention.

FIG. 4 gives the percentage of recovery of the present material prepared in example. Although the residual expansion of the specimen was increased at higher strain, the recovery rate of the compatibly blended polymer was consistent at 97–98% between 100% to 500% elongation, which is very high compared to other polymers of this type. In contradistinction, either α-PP alone or blended with i-PP is virtually without elasticity.

Figure 5:
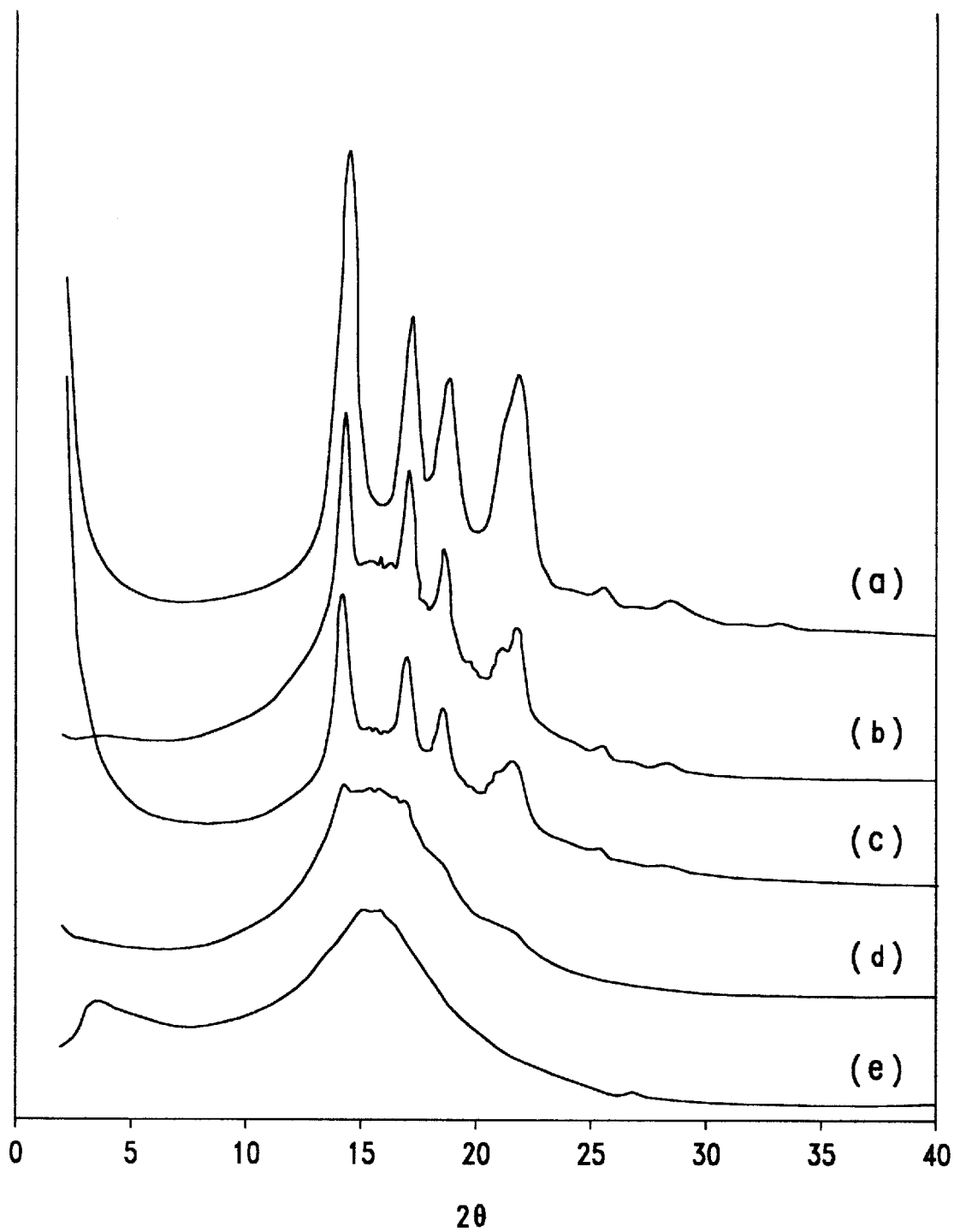
FIG. 5 illustrate the X-ray diffraction patterns of: (a) the isotactic polypropylene obtained with Cat. 1 alone; (b) the solution-cast blend of isotactic polypropylene obtained with Cat. 1 and atactic polypropylene obtained with Cat. 3; (c) the isotactic/atactic polypropylene blend synthesized with Cat.1 and Cat. 3 immobilized on silica; (d) the compatible isotactic/atactic polypropylene blend in Example 1 of the present invention; and (e) the atactic polypropylene obtained with Cat. 3 alone.
Figure 6:
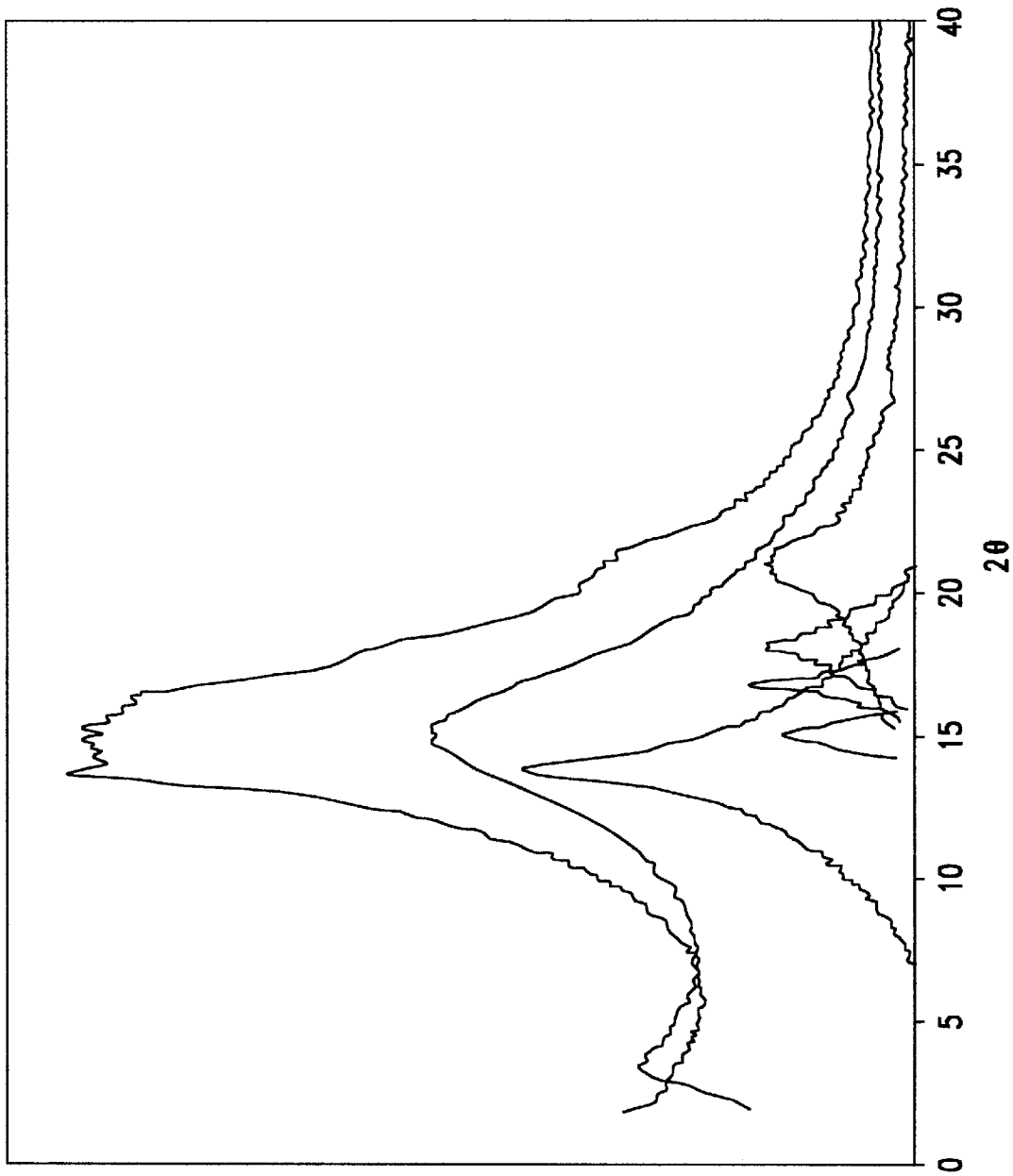
FIG. 6 illustrates the deconvolution analysis of the XRD pattern in FIG. 5d.

Thermal and X-ray diffraction (XRD) data support the conclusion that the thermoplastic elastomer obtained in the presence of cross-over agent is morphologically different from the separately synthesized homopolymers. At the same isotactic polypropylene to atactic polypropylene ratio, the two types of materials have the same heat of fusion. The XRD of the latter blend (FIG. 5b), however, is seen to be a superimposed isotactic polypropylene on the amorphous halo indicating large size isotactic crystallites and macrophase separation. In contrast, the XRD of the directly synthesized compatible thermoplastic elastomeric polypropylene of Example 1 below, of the present invention (FIG. 5d) barely shows a hint of the α reflections. The reflections become resolved with a deconvolution analysis (FIG. 6). In other words, the crystallite sizes are minute indicating phase boundary mixing through interpenetration of domains and there is only microphase separation.

The following examples specifically illustrate the present invention.

EXAMPLE 1

An isospecific and a nonspecific catalyst were employed in the polymerization. A 250 mL crown-capped glass pressure reactor with a magnetic stirring bar was first evacuated, flushed with argon, then charged with 50 mL of toluene. The system was evacuated again and saturated with propylene for ca. 20 min. to 15 psig. Tri-i-butyl aluminum (5 mM) rac-dimethylsilyienebis(1-$\eta^5$-indenyl)dichlorozirconium (Cat. 1, 4 $\mu$M) and ethylenebis(9-$\eta^5$-fluorenyl) dichlorozirconium (Cat. 3, 6 $\mu$M) were injected with syringe as toluene solutions. The system was heated to the desired temperature ($T_p$) stirred for ca. 20 additional min. to saturate it with propylene at this temperature. Finally a toluene solution of the cocatalyst (cocat. 10 $\mu$M) was introduced to initiate the polymerization. Upon completion, the polymerization mixture was quenched with acidic methnol (containing 2% HCl), filtered, washed with methanol, and dried at 70° C. under vacuum to a constant weight 4.38 g of a thermoplastic elastomer was obtained.

A sample was fractionated using several solvents under refluxing conditions. Acetone did not dissolve any polymer, but diethyl ether extracted 50.7 wt % of polymer, which has the $^{13}$C NMR of atactic polypropylene (FIG. 1c). Pentane and hexane did not dissolve any polypropylene. Refluxing heptane extracted 7 wt %, the NMR spectra of which (FIG. 1b) is that of an isotactic/atactic block copolymer. The remaining 42 wt % heptane insoluble materials are the isotactic polypropylene (FIG. 1a). The catalytic activity of polymerization was 7.3×10$^7$ g PP/(mol Zr.[C$_3$H$_6$].h). The product has a peak melting transition of 149.3° C., heat of fusion $\Delta H_f$=11.5 cal/g.

EXAMPLES 2–15

Example 1 was repeated except that the differing conditions indicated in Table I were employed, respectively.

TABLE I

| | [Cat 1] ($\mu$M) | [Cat 3] ($\mu$M) | [TIBA] (mM) | Yield (g) | A × 10$^{-7}$ g PP/(mol Zr .[C$_3$H$_6$].h) | $T_m$ (° C.) | $\Delta H_f$ (cal/g) |
|---|---|---|---|---|---|---|---|
| Example | | | | | | | |
| 1 | 4 | 6 | 5 | 4.38 | 7.3 | 149.3 | 11.5 |
| 2 | 5 | 1.3 | 4 | 1.22 | 3.7 | 152.2 | 19.4 |
| 3 | 4 | 4 | 4 | 1.52 | 4.2 | 152.2 | 16.3 |
| 4 | 4 | 6 | 4 | 1.86 | 4.1 | 151.8 | 15.2 |
| 5 | 3 | 7 | 4 | 0.70 | 1.0 | 151.2 | 5.4 |
| 6 | 2 | 8 | 4 | 1.18 | 1.6 | 152.0 | 7.2 |
| 7 | 1 | 9 | 4 | 0.95 | 1.3 | 151.0 | 3.1 |
| 8 | 4 | 1 | 5 | 1.20 | 3.2 | 151.1 | 14.0 |
| 9 | 5 | 3.3 | 5 | 3.10 | 5.0 | 149.8 | 15.7 |
| 10 | 2 | 8 | 5 | 3.24 | 5.4 | 150.0 | 8.9 |
| 11 | 5 | 3.3 | 6 | 1.72 | 6.9 | 152.1 | 11.6 |
| 12 | 4 | 4 | 6 | 1.55 | 6.5 | 151.8 | 9.0 |
| 13 | 4 | 6 | 6 | 2.31 | 6.2 | 150.9 | 5.5 |
| 14 | 3 | 7 | 6 | 2.63 | 7.0 | 150.7 | 3.9 |
| 15 | 2 | 8 | 6 | 1.89 | 5.0 | 150.0 | 2.0 |

PC$_3$H$_6$ = 15 psig, T$_p$ = 0° C., [Cocat] = [Cat 1] + [Cat 3].

EXAMPLE 16

An isospecific and a nonspecific catalyst were employed in the polymerization. A 250 mL crown-capped glass pressure reactor with a magnetic stirring bar was first evacuated, flushed with argon, then charged with 50 mL of toluene. The system was evacuated again and saturated with propylene for ca. 20 min. to 15 psig. Tri-i-butyl aluminum (5 mM), rac-ethylenebis(1-$\eta^5$-indenyl)dichlorozirconium (Cat. 2, 1 $\mu$M) and ethylenebis(9-$\eta^5$-fluorenyl)dichlorozirconium (Cat. 3, 9 $\mu$M) were injected with syringe as a toluene solution. The system was heated to the desired temperature ($T_p$), stirred for ca. 20 additional min. to saturate it with propylene at this temperature. Finally a toluene solution of the cocatalyst (Cocat. 10 $\mu$M) was introduced to initiate the polymerization. Upon completion, the polymerization mixture was quenched with acidic methanol (containing 2% HCl), filtered, washed with methanol, and dried at 70° C. under vacuum 1.6 g of a thermoplastic elastomeric polypropylene was obtained.

A sample was fractionated using several solvents under refuxing conditions. Acetone did not dissolve any polymer but diethyl ether extracted 90% wt which has $^{13}$C NMR for atactic polypropylene. Refluxing hexane extracted 10% wt the NMR spectra of which is that of an isotactic/atactic block copolymer. The catalytic activity of polymerization was 7.3×10$^7$ g PP/(mol Zr.[C$_3$H$_6$].h). The product has a peak melting transition of 149.3° C., heat of fusion $\Delta H_f$=11.5 cal/g and is a very strong thermoplastic elastomer.

EXAMPLES 17–25

Example 16 was repeated except that the differing conditions indicated Table II were employed, respectively.

TABLE II

| | [Cat 2] ($\mu$M) | [Cat 3] ($\mu$M) | [TIBA] (mM) | $T_p$ (° C.) | Yield (g) | A × 10$^{-7}$ g PP/(mol Zr .[C$_3$H$_6$].h) | $T_m$ (° C.) | $\Delta H_f$ (cal/g) |
|---|---|---|---|---|---|---|---|---|
| Example | | | | | | | | |
| 16 | 8 | 2 | 5 | 0 | 1.91 | 2.1 | 147.7 | 7.4 |
| 17 | 6 | 4 | 5 | 0 | 2.73 | 3.0 | 146.3 | 4.6 |
| 18 | 4 | 6 | 5 | 0 | 2.47 | 2.7 | 146.0 | 2.2 |
| 19 | 2 | 8 | 5 | 0 | 2.87 | 3.2 | 145.5 | 1.2 |
| 20 | 1 | 9 | 5 | 0 | 1.60 | 0.7 | 145.3 | 0.5 |
| 21 | 6 | 4 | 5 | 25 | 4.55 | 8.4 | 141.2 | 8.2 |
| 22 | 4 | 6 | 5 | 25 | 4.33 | 8.0 | 140.5 | 5.7 |
| 23 | 3 | 7 | 5 | 25 | 5.10 | 9.5 | 138.9 | 3.9 |
| 24 | 2 | 8 | 5 | 25 | 5.34 | 9.9 | 137.9 | 2.7 |
| 25 | 1 | 9 | 5 | 25 | 5.84 | 10.8 | 135.7 | 0.9 |

PC$_3$H$_6$ = 15 psig, T$_p$ = 0° C., [Cocat] = [Cat 2] + [Cat 3]. [b]TPE = thermoplastic elastomer; E = elastomer.

EXAMPLE 26

A syndiospecific and a nonspecific catalyst were employed in the polymerization. A 250 mL crown-capped glass pressure reactor with a magnetic stirring bar was first evacuated, flushed with argon, then charged with 50 mL of toluene. The system was evacuated again and saturated with propylene for ca. 20 min. to 15 psig. Tri-i-butyl aluminum (5 mM), diphenylmethylidene(1-$\eta^5$-cyclopentadienyl)(9-$\eta^5$-fluorenyl)dichlorozirconium (Cat. 4, 10 $\mu$M) and ethylenebis(9-$\eta^5$-fluorenyl)dichlorozirconium (Cat. 3, 15 $\mu$M) were injected with syringe as toluene solution. The system was heated to the desired temperature ($T_p$), stirred for ca. 20 additional min. to saturate it with propylene at this temperature. Finally a toluene solution of the cocatalyst (Cocat, 10 $\mu$M) was introduced to initiate the polymerization. Upon completion, the polymerization mixture was quenched with acidic methanol (containing 2% HCl) filtered, washed with methanol, and dried at 70° C. under vacuum to give 3.43 g of thermoplastic elastomeric polypropylene.

The catalytic activity was $7.8 \times 10^7$ g PP/(mol Zr.[$C_3H_6$].h). The TPE polypropylene product had a peak melting transition of $T_m = 137.6°$ C. and heat of fusion of $\Delta H_f = 23.9$ cal/g.

Figure 7:
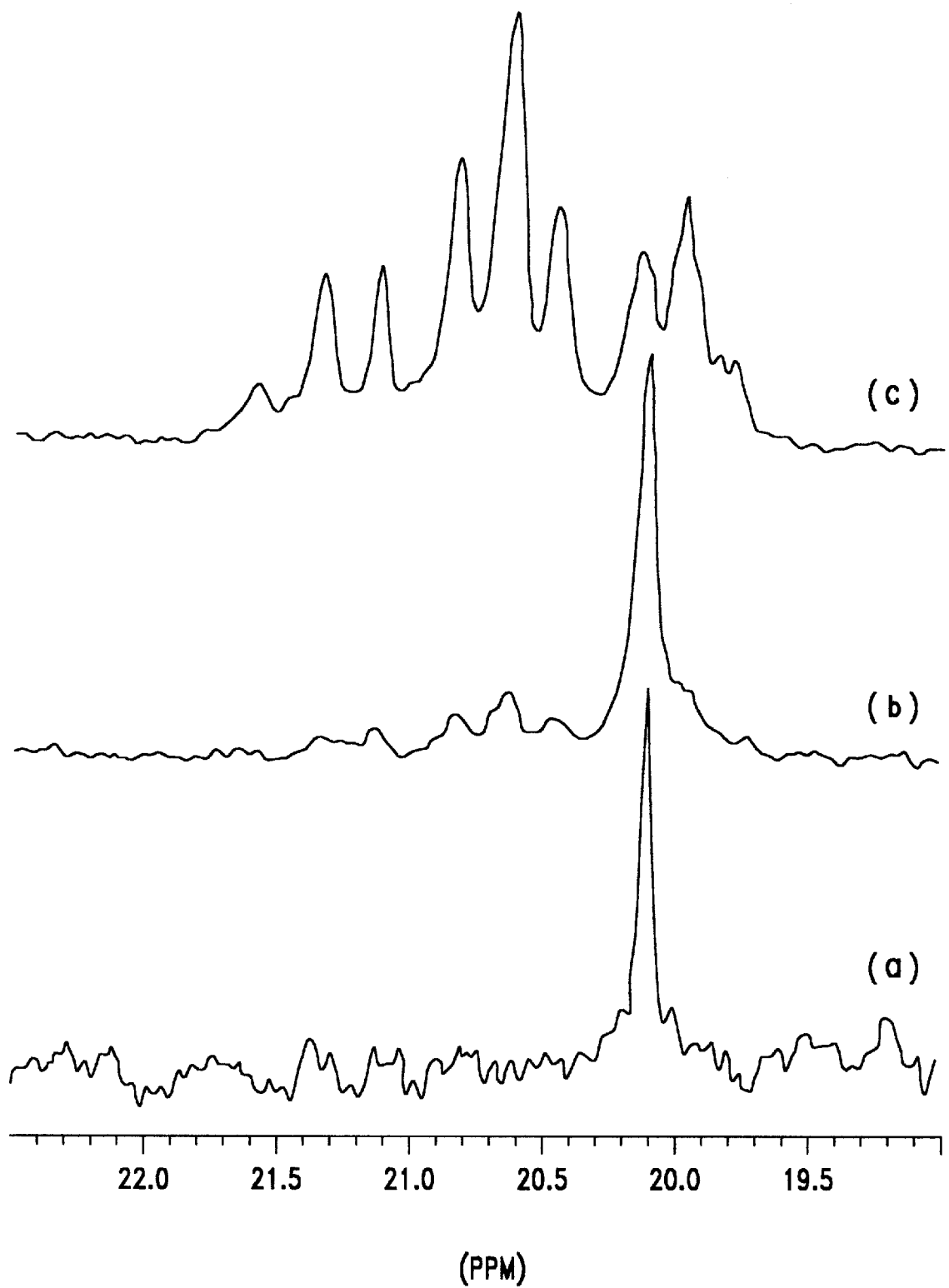
FIG. 7 illustrates the room temperature $^{13}C$ NMR spectra in the methyl region of the syndiotactic polypropylene in later presented Example 26 of the present invention; including (a) the heptane insoluble syndiotactic fraction; (b) the heptane and hexane soluble stereoblock fraction; and (c) the diethylether soluble atactic fraction.
Figure 8:
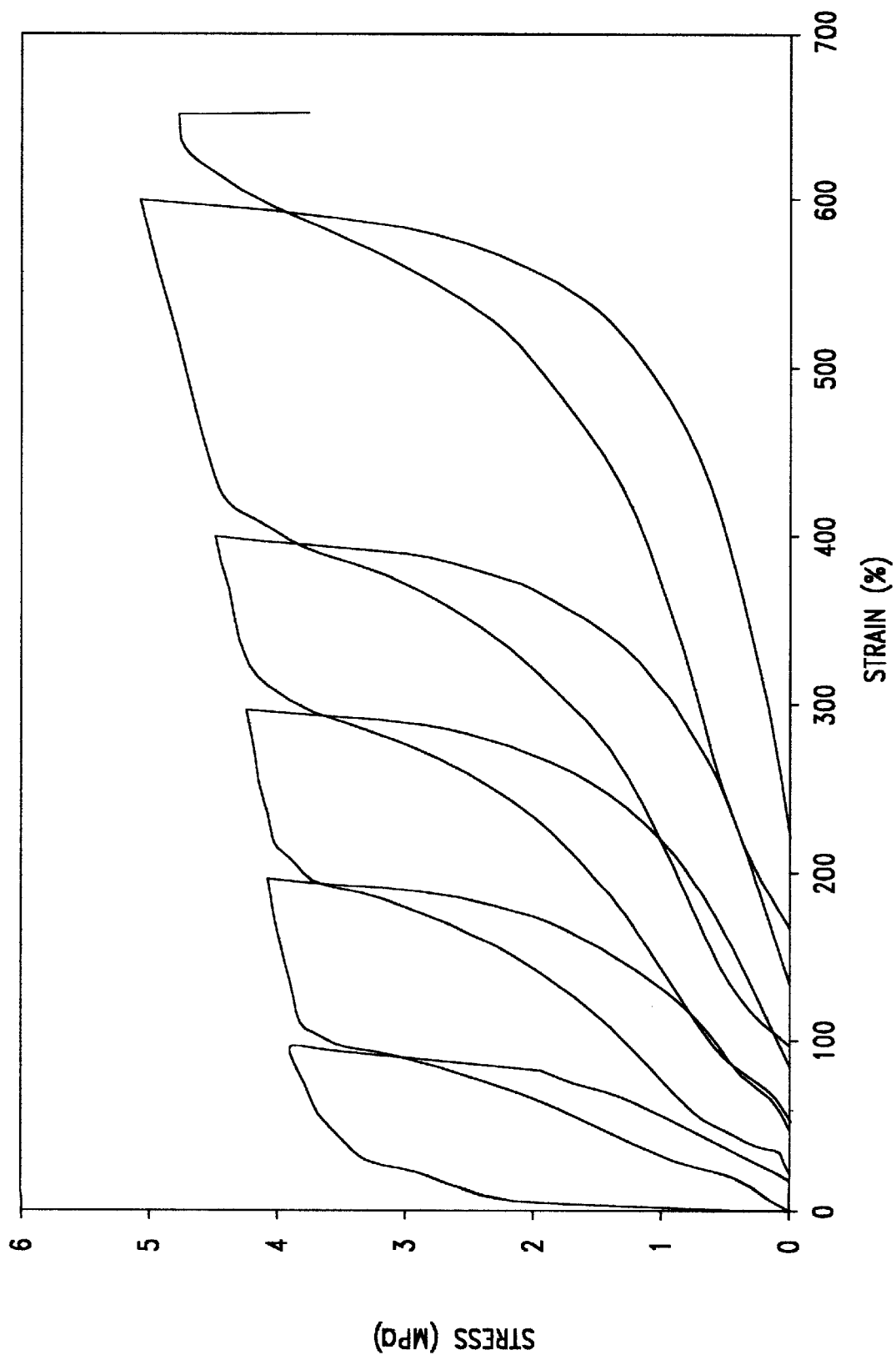
FIG. 8 illustrates the relaxation time testing of the compatible syndiotactic/atactic polypropylene blend in Example 26 of the present invention.

A sample was fractionated using several solvents under refluxing conditions. Acetone did not dissolve any polymer but diethyl ether extracted 65.7 wt % which has $^{13}$C NMR for atactic polypropylene (FIG. 7c) with [rrrr]=0.11 and total for all other pentads=0.89. Pentane did not dissolve any polypropylene. Refluxing hexan extrated 5.5 wt % and refluxing heptane extracted 16.1 wt % of the sample. Their NMR spectra (FIG. 7b) is that of a syndiotactic block copolymer with [rrrr]=0.67 and total all other pentads=0.33. The remaining 12.7 wt % heptane insoluble material is the syndiotactic polypropylene with [rrrr]=1.0 (FIG. 7a).

EXAMPLES 27–33

Example 26 was repeated except that the differing conditions indicarewd in Table III were employed, respectively.

TABLE III

| Example | [Cat 4] (μM) | [Cat 3] (μM) | [TIBA] (mM) | $T_p$ (° C.) | Yield (g) | A × 10$^{-7}$ g PP/(mol Zr .[$C_3H_6$].h) | $T_m$ (° C.) | $\Delta H_f$ (cal/g) |
|---|---|---|---|---|---|---|---|---|
| 26 | 10 | 15 | 5 | 0 | 2.3 | 3.43 | 138.5 | 8.05 |
| 27 | 5 | 0 | 5 | 0 | 0.77 | 2.0 | 150.2 | 20.7 |
| 28 | 5 | 20 | 5 | 0 | 3.09 | 5.5 | 137.6 | 5.7 |
| 29 | 5 | 0 | 5 | 25 | 0.65 | 3.0 | 138.5 | 20.6 |
| 30 | 6 | 4 | 5 | 25 | 2.91 | 6.7 | 132.7 | 8.05 |
| 31 | 4 | 6 | 5 | 25 | 3.41 | 6.3 | 130.5 | 4.52 |
| 32 | 2 | 8 | 5 | 25 | 4.79 | 6.7 | 132.9 | 3.82 |
| 33 | 1 | 9 | 5 | 25 | 4.79 | 6.7 | 129.0 | 1.72 |

$PC_3H_6$ = 15 psig, [Cocat] = [Cat 4] + [Cat 3]. $^b$Sample not annealed prior to DSC scan.

While stress has been placed on the preferred thermoplastic elastomeric syndiotactic-atactic and isotactic-atactic polypropylene of the invention, clearly other polyolefin alloys may be similarly prepared with the technique of also readily suggest themselves to those skilled in the art . . . such being considered to fall within the spirit and scope of the invention as defined in the appended claims.

What is claimed is:

1. A compatible polyolefin alloy comprising two homopolymers $A_n$ and $B_m$ derived from the same monomer having dissimilar stereoisomeric structures and a block copolymer of the formula $(A_a B_b)_x$, wherein n and m are integers from 1,000 to 30,000, a and b are integers from 10 to 1,000, and x is an integer from 1 to 100, wherein the polyolefin alloy has a weight ratio of $A_n$ and $B_m$ between 100 to 1 and 1 to 100 and the block copolymer $(A_a B_b)_x$ is between 2 and 20% by weight.

2. A compatible polyolefin alloy in accordance with claim 1 wherein the monomer is propylene.

3. A compatible polyolefin alloy in accordance with claim 2 wherein $A_n$ is syndiotactic polypropylene molecule and $B_m$ is atactic polypropylene molecule and $A_a$ is syndiotactic polypropylene sequence and $B_b$ is atactic polypropylene sequence in the same macromolecule.

4. A compatible polyolefin alloy in accordance with claim 2 wherein $A_n$ and $A_a$ have the isotactic microstructure and $B_m$ and $B_b$ have the atactic microstructure.

5. A compatible polyolefin alloy in accordance with claim 1 wherein the monomer is α-olefin having 4 to 10 carbon atoms.

6. A compatible polyolefin alloy in accordance with claim 5 wherein $A_n$ and $A_a$ have the syndiotactic microstructure and $B_m$ and $B_b$ have the atactic microstructure.

7. A compatible polyolefin alloy in accordance with claim 5 wherein $A_n$ and $A_a$ have the isotactic microstructure and $B_m$ and $B_b$ have the atactic microstructure.

8. A compatible polyolefin alloy of claim 1 wherein the polyolefin alloy prepared is characterized as a thermoplastic elastomer.

9. A compatible polypropylene alloy as claimed in claim 2 wherein said dissimilar stereoisomeric structures are syndiotactic and atactic polypropylene, and said block copolymer comprises alternating sequences of such syndiotactic and atactic structures.

10. A compatible polypropylene alloy as claimed in claim 2 wherein said dissimilar stereoisomeric structures are isotactic and atactic polypropylene, and said block copolymer comprises alternating sequences of such isotactic and atactic structures.

* * * * *